United States Patent [19]

Nowka et al.

[11] Patent Number: 6,084,944
[45] Date of Patent: Jul. 4, 2000

[54] SYSTEM FOR AUTOMATED VOICE TERMINAL RECOGNITION AND DYNAMIC REPRESENTATION ON A TEST FACILITY

[75] Inventors: Dennis R. Nowka, Thornton; Gene M. Uba, Broomfield, both of Colo.

[73] Assignee: Lucent Technologies Inc., Murray Hill, N.J.

[21] Appl. No.: 09/093,486

[22] Filed: Jun. 8, 1998

[51] Int. Cl.[7] .................................................. H04M 1/24
[52] U.S. Cl. ................................ 379/1; 379/6; 379/15; 379/29
[58] Field of Search .............................. 379/1, 9–10, 15, 379/26, 27, 29, 34

[56] References Cited

U.S. PATENT DOCUMENTS

| | | | |
|---|---|---|---|
| 4,924,489 | 5/1990 | Lawrence et al. | 379/6 |
| 5,309,509 | 5/1994 | Cocklin et al. | 379/165 |
| 5,384,822 | 1/1995 | Brown et al. | 379/10 |
| 5,633,909 | 5/1997 | Fitch | 379/15 |
| 5,757,680 | 5/1998 | Boston et al. | 364/579 |

*Primary Examiner*—Curtis A. Kuntz
*Assistant Examiner*—Binh K. Tieu
*Attorney, Agent, or Firm*—Duft,Graziano&Forest,P.C.

[57] ABSTRACT

The dynamic test unit presents the operator with a dynamically changing visual representation of the voice terminal under test and its present state. This visual representation provides the operator with an enhanced visual comparison of voice terminal under test with the virtual representation to verify both the type of voice terminal under test and its present state. By providing a visual representation of the voice terminal under test, only minimal operator training is required and the test facility interface is made language independent. The dynamic test unit can also display visual images of the signals that are applied to the voice terminal under test and the signals received therefrom to enable the operator of the test facility to precisely analyze the operation of the voice terminal under test. In addition, the dynamic test unit automatically identifies the nature of the voice terminal that is connected to the voice terminal test facility in a manner that ensures that neither the voice terminal nor the voice terminal test facility is subject to damage. This is accomplished by the application of a predetermined set of low potential test signals to the voice terminal under test, which set of low potential test signals is selected to elicit a response from the voice terminal under test that accurately identifies the protocol used by the voice terminal under test.

12 Claims, 3 Drawing Sheets

SYSTEM FOR AUTOMATED VOICE TERMINAL RECOGNITION AND DYNAMIC REPRESENTATION ON A TEST FACILITY

CROSS REFERENCE TO RELATED APPLICATIONS

This application is related to a U.S. patent application Ser. No. 09/093,326, titled "Automated Voice Terminal Protocol Identification System", filed on the same date as the present application.

FIELD OF THE INVENTION

This invention relates to test facilities and, in particular, to a system that automatically identifies the nature of the voice terminal that is connected to the test facility and presents a virtual image of the voice terminal to the operator, which virtual image dynamically changes to correspond to the changes in the state of the voice terminal under test.

PROBLEM

It is a problem in the field of test equipment to provide a test facility that is simple to use and that provides adequate information to the operator in a format that facilitates the performance of the tests. Existing test facilities that are used to test telecommunications voice terminal equipment display a text message to the operator to identify the type of voice terminal that is presently being tested and the test that is in progress. The difficulty with such an architecture is that the text message is susceptible to misinterpretation by the operator and provides only limited information to enable the operator to perform the test. In addition, the test facility must be programmed in numerous languages to correspond to the various markets into which the test facility is sold. Such a system also requires a significant amount of operator training to enable the operator to understand the operation of the voice terminal under test and the representation of this operation in terms of the text messages that are displayed.

If the operator misinterprets the text message, such as misidentifying the type of voice terminal connected to the test facility, the test results are meaningless and the voice terminal could be subject to damage by the performance of tests that are inappropriate for this type of terminal. For example, in the field of telephone communication systems, there are numerous voice terminals that are presently in use, which voice terminals have a common physical termination but incompatible electrical characteristics. In particular, there are three different communication protocols that share the same physical voice terminal connection in telephone switching systems. These protocols are: ATL/ETR; Digital Communication Protocol (DCP)—2 wire and 4 wire; and ISDN/NT2–4 wire. Each of these protocols relies on phantom power obtained from the signaling leads to provide the power to the voice terminal. However, the three protocols each have a unique phantom power arrangement and the connection of a voice terminal to a voice terminal test facility that is programmed for one of the other voice terminal protocols can result in damage to the voice terminal and/or the voice terminal test facility.

SOLUTION

The above described problems are solved and a technical advance achieved in the field by the present system for automatic voice terminal recognition and dynamic representation on a test facility (termed "dynamic test unit" herein). The dynamic test unit presents the operator with a dynamically changing visual representation of the voice terminal under test and its present state. This visual representation provides the operator with an enhanced visual comparison of voice terminal under test with the virtual representation to verify both the type of voice terminal under test and its present state. By providing a visual representation of the voice terminal under test, only minimal operator training is required and the test facility interface is made language independent. The dynamic test unit can also display visual images of the signals that are applied to the voice terminal under test and the signals received therefrom to enable the operator of the test facility to precisely analyze the operation of the voice terminal under test.

In addition, the dynamic test unit automatically identifies the nature of the voice terminal that is connected to the voice terminal test facility in a manner that ensures that neither the voice terminal nor the voice terminal test facility is subject to damage. This is accomplished by the application of a predetermined set of low potential test signals to the voice terminal under test, which set of low potential test signals is selected to elicit a response from the voice terminal under test that accurately identifies the protocol used by the voice terminal under test. If the result of this first test is inconclusive, successive set(s) of non-damaging test signals are applied to the voice terminal under test to precisely determine the type of voice terminal, prior to the application of the test sequence.

The initial set of non-damaging test signals that are used in this system comprises low potential DC loop measurement signals to identify selected DC characteristics of the voice terminal under test. This initial test can distinguish among many of the voice terminal types and therefore eliminates the need for further testing. If these results are insufficient to distinguish between two voice terminal types that share common DC characteristics, then additional, secondary test operations can be initiated to further delimit the type of voice terminal that is connected to the common test port of the voice terminal test facility. In particular, the AC characteristics, such as signaling protocol typically differ among the various voice terminal types, and once the DC characteristics are determined, the voice terminal under test can be queried, in a power up or partially powered up mode, to determine the AC characteristics of the voice terminal under test.

DETAILED DESCRIPTION

The dynamic test unit presents the operator with a dynamically changing visual representation of the voice terminal under test and its present state. This visual representation provides the operator with an enhanced visual comparison of voice terminal under test with the virtual representation to verify both the type of voice terminal undertest and its present state. By providing a visual representation of the voice terminal under test, only minimal operator training is required and the test facility interface is made language independent. The dynamic test unit can also display visual images of the signals that are applied to the voice terminal under test and the signals received therefrom to enable the operator of the test facility to precisely analyze the operation of the voice terminal under test.

Figure 1:
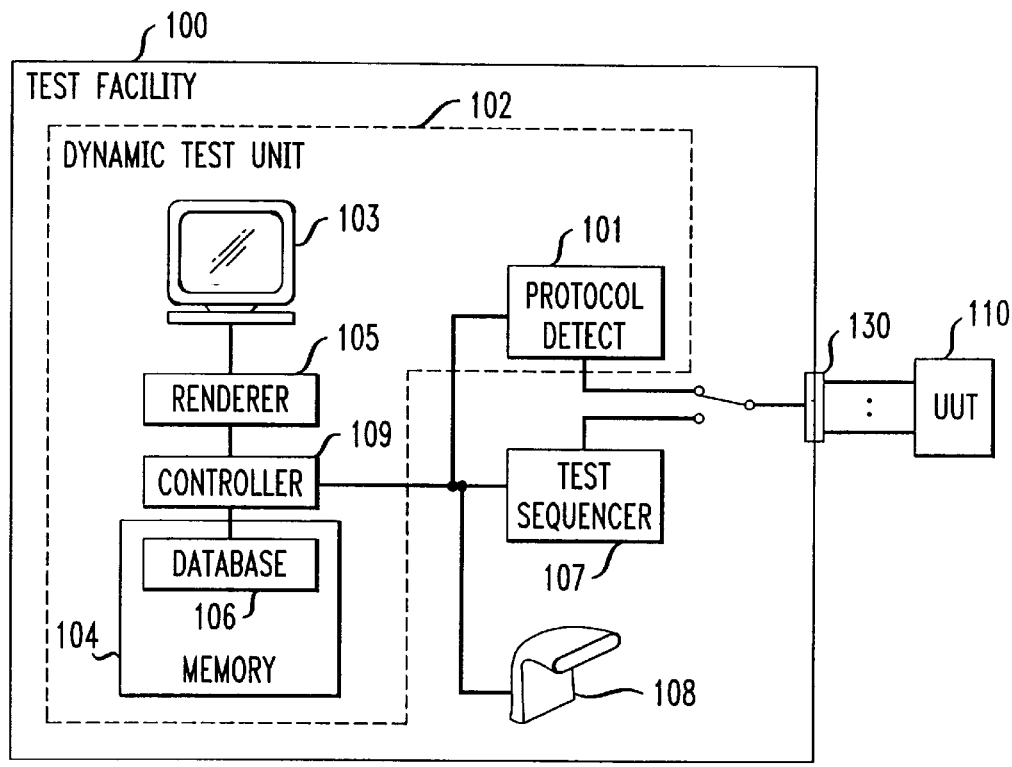
FIG. 1 illustrates in block diagram form the architecture of the present dynamic test unit.

FIG. 1 illustrates in block diagram form the architecture of the present dynamic test unit 102 that provides these features. In particular, the test facility 100 is equipped with a common test port 130 that is used interconnect the voice terminal under test 110 to the test facility 100. The dynamic test unit 102 is resident in the test facility 100 and includes an automated voice terminal protocol identification system 101 that is shown in greater detail in FIG. 4. The automated voice terminal protocol identification system 101 is used to automatically identify the protocol of the voice terminal under test 110. A bar code reader 108 is optionally also used to automatically and precisely identify the type and configuration of the voice terminal under test 110. Included in the test facility 100 is a database 104, stored in a memory 106, that contains information relating to each type of voice terminal, including barcode model information, number of buttons, color of the voice terminal under test, test limits, function of buttons and Light Emitting Diodes, test procedures, and the like. A controller 109 is provided to receive the voice terminal identification and retrieve the predetermined voice terminal image data from the database 104, which data is used by renderer 105 to produce a virtual image of the voice terminal under test 110 on monitor 103. The test facility 100 is equipped with a test sequencer 107 that generates sequences of test signals and receives signal responses from the voice terminal under test 110, as is well known in the field of test facilities, to exercise the voice terminal under test 110 and identify any faults in its operation. The controller interacts with the test sequencer 107, database 104 and renderer 105 to dynamically update the virtual image of the voice terminal under test 110 on display 103 to thereby present a visual image of the proper state of the voice terminal under test 110, which can be compared by the operator to the actual state of the voice terminal under test 110.

Automated Voice Terminal Protocol Identification System

One component that automates the operation of the test facility 100 is the automated voice terminal protocol identification system 101 that functions to detect and identify voice terminal products that are connected to a common test port on a voice terminal test facility. The inherent danger in testing a variety of products using a common test port is that the test facility operator can select the incorrect test, thereby subjecting the voice terminal to incorrect and potentially damaging signals. In particular, there are three different communication protocols that share the same physical voice terminal connection in telephone switching systems. These protocols are: ATL/ETR; Digital Communication Protocol (DCP)—2 wire and 4 wire; and ISDN/NT2–4 wire. Each of these protocols relies on phantom power obtained from the signaling leads to provide the power to the voice terminal. However, the three protocols each have a unique phantom power arrangement and the connection of a voice terminal to a voice terminal test facility that is programmed for one of the other voice terminal protocols can result in damage to the voice terminal and/or the voice terminal test facility. The present automated voice terminal protocol identification system allows the test facility to automatically identify the connected voice terminal under test before any potentially damaging potentials are applied to the voice terminal by the test facility.

The automated voice terminal protocol identification system incorporates voice terminal detection hardware 101A, 101B that includes a plurality of low potential signal application circuits 111, 113 that apply signals of low voltage and/or current to selected terminals of the common test port 130. The low potential signals are selected to have signal characteristics that are non-damaging to any of the circuitry contained in any of the voice terminals that can be connected to the common test port 130 and, in particular, to these selected terminals. Resistive voltage application circuits 111, 113 are used in the preferred embodiment to produce the low potential signals that are connected to the selected terminals of the common test port 130. In response to a resistive non-damaging voltage potential being applied to these selected terminals, critical detection points are monitored for the presence or absence of predetermined signals. An analysis of the signal conditions on the terminals of the common test port 130 produces a voice terminal signature that uniquely identifies the one of the three protocols that are in use in the voice terminal that is connected to the common test port 130. Identification of the particular voice terminal is typically based upon the differences of DC loop configurations between the voice terminals. This determination is usually sufficient to distinguish among the terminals, but in addition, when the DC loop configurations of the voice terminals are identical, AC signal characteristics and/or communication protocols differ and represent a second tier of terminal identification. Therefore, an incremental process can be implemented, progressing from simple measurements to more complex measurements to precisely determine the identity of the voice terminal.

System Implementation

Figure 5:
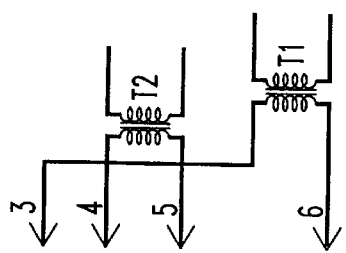
FIG. 5 illustrates the DC loop portion of an ISDN based voice terminal.
Figure 4:
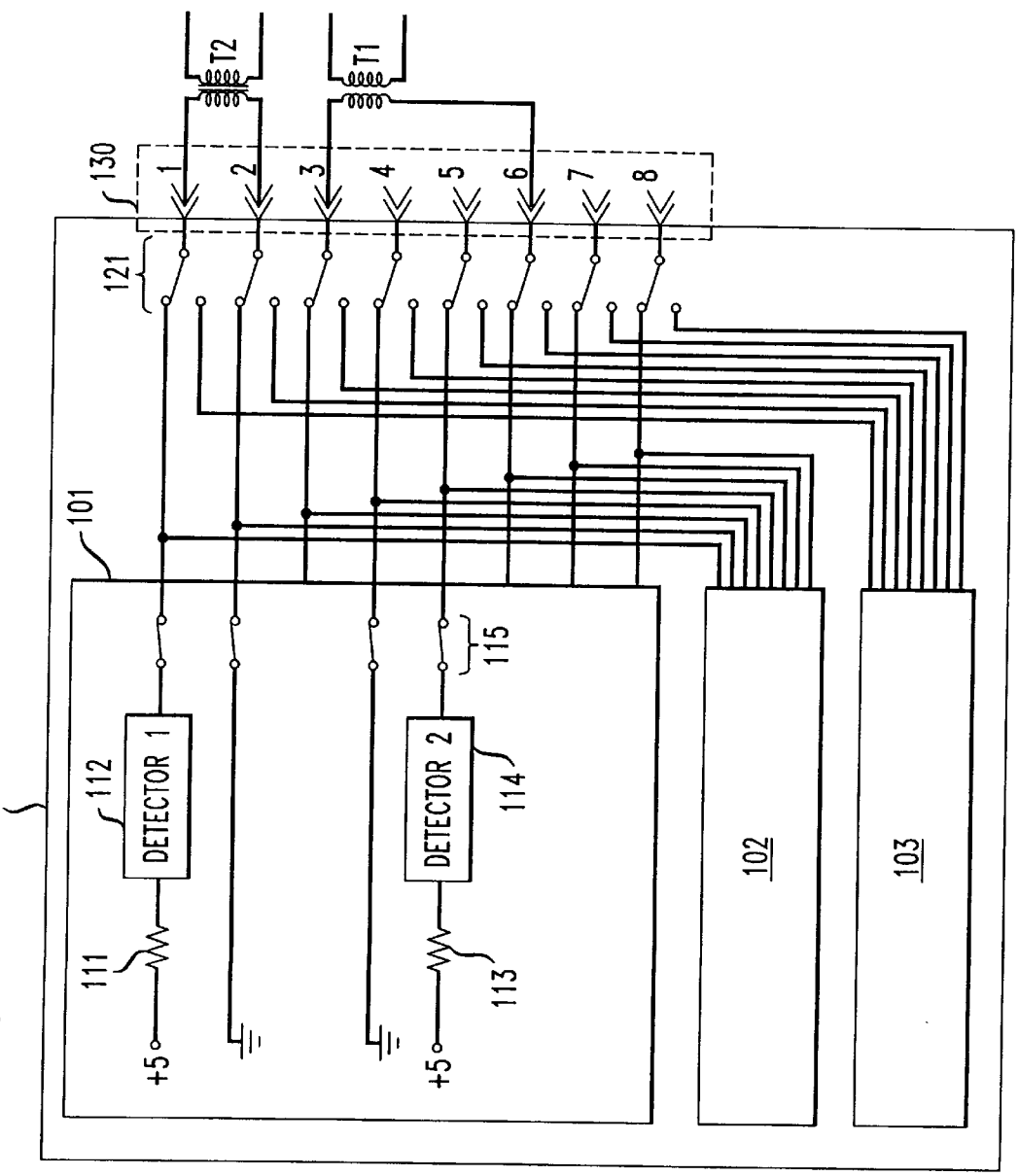
FIG. 4 illustrates the automated voice terminal protocol identification system connected to the DC loop segment of a DCP based voice terminal.

FIG. 4 illustrates the present automated voice terminal protocol identification system connected to the DC loop portion of a DCP based voice terminal and FIG. 5 illustrates the DC loop portion of an ISDN based voice terminal. The voice terminal test system includes a common test port 130 that presents a common physical termination for all of the voice terminals that are tested by the voice terminal test system. The common test port 130 typically comprises a standard connector in the form of a telephone jack that serves to terminate the cable that extends from the voice terminal. The common test port 130 is shown as incorporating eight conductors, each terminating on a particular pin of the connector, and labeled 1–8 on FIGS. 4 and 5. The automated voice terminal protocol identification system 101A, 101B is shown as being connectable to the common test port 130 via switch contacts 121 to thereby enable the voice terminal test system to selectively interconnect either the automated voice terminal protocol identification system 101A, 101B or the test apparatus 107 contained in the voice terminal test system to the common test port 130. The automated voice terminal protocol identification system includes at least one tier 101A of voice terminal identification circuits and two such sets of circuits 101A, 101B are shown herein. The first tier of test signals that are generated are DC loop signals that identify the DC characteristics of the voice terminal using low potential DC signals. The second tier of voice terminal identification circuits 101B comprise AC and/or protocol identification circuits.

The automated voice terminal protocol identification system identifies a single distinguishing characteristic or simple set of characteristics for each of the voice terminal protocols. In the example shown herein, the DC loop characteristics of the two voice terminal protocols differ and thereby represent a distinguishing characteristic. In order to minimize the-time required to identify the voice terminal, the automated voice terminal protocol identification system generates a set of test signals that concurrently checks for the distinguishing characteristics of all of the voice terminals. The one test signal of the set that is identified as corresponding to the defined signal input of the present voice terminal defines the nature of the voice terminal. As can be seen from the DC loop wiring configurations for these two terminals, there is a unique attribute for these two terminals. These terminals share a common wiring characteristic of a first loop transformer T1 connected across terminals 3 and 6 of the eight conductor termination. Therefore, monitoring or testing these terminals is unnecessary to distinguish between the two terminal types. However, the second loop transformer T2 in the DCP terminal is connected across terminals 1 and 2, while the second loop transformer T2 in the ISDN terminal is connected across terminals 4 and 5. Therefore, by sensing the location of the second loop transformer T2 in a low potential manner distinguishes between these two terminal types.

The test operates by interconnecting the automated voice terminal protocol identification system to the terminals of the common test port 130 via switch contacts 121 to enable the low potential generating circuits to apply their predetermined test signals to the selected terminals of the common test port. A plurality of detector circuits 112, 114 are included in the automated voice terminal protocol identification system to monitor the response of the voice terminal under test to the application of these test signals to the selected terminals of the common test port 130. These detector circuits 112, 114 are illustrates as series connected elements and can comprise either voltage or current measuring circuits. The output signals produced by the detector circuits 112, 114 can be in the form of logical outputs shown below.

| Detector 1 output | Detector 2 output | Voice Terminal type |
| --- | --- | --- |
| 1 | 1 | DCP |
| 1 | 0 | ISDN |

The outputs from the detectors 112, 114 are applied to a voice terminal identification circuit that combines the received logic inputs to produce an output signal indicative of the type of voice terminal that is connected to the common test port. This output signal is transmitted to the remaining circuitry 107 in the voice terminal test system 100 to enable only the full power tests and test sequences that are appropriate for the identified voice terminal type.

Operation of the Dynamic Test Unit

Figure 3:
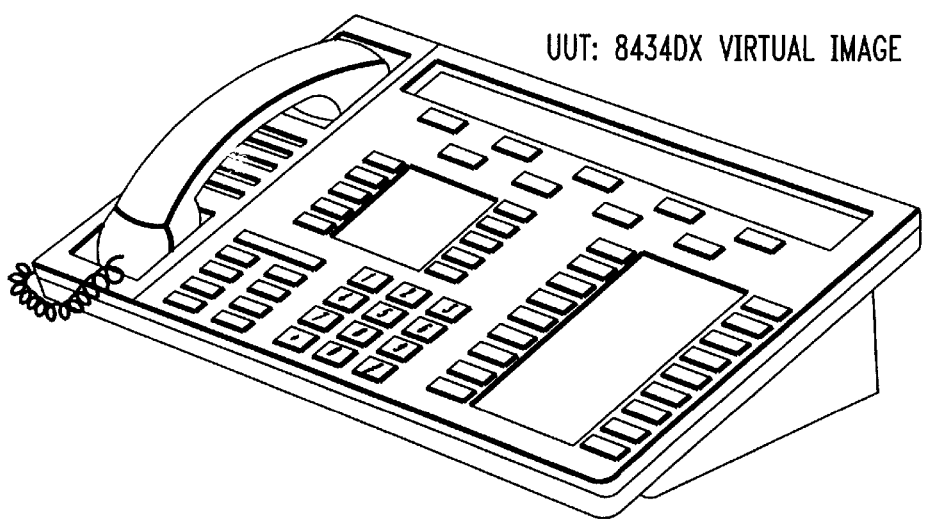
FIG. 3 illustrates an example of a display produced by the present dynamic test unit.
Figure 2:
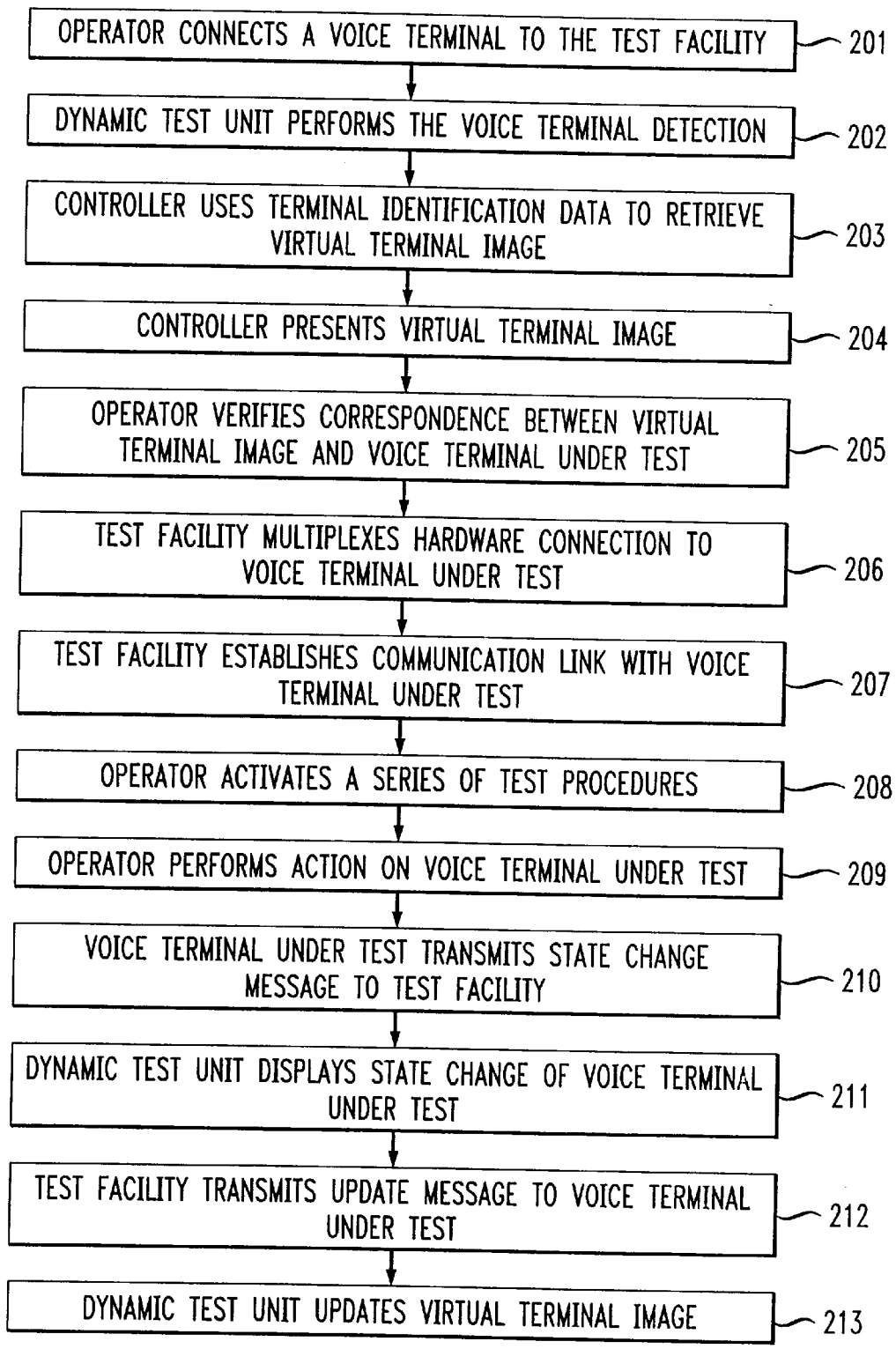
FIG. 2 illustrates in flow diagram form the operation of the present dynamic test unit.

As noted above, the dynamic test unit 102 functions to provide the operator with a virtual image of the voice terminal under test 110. In order to better understand the operation of the system characterized above, FIG. 2 illustrates in flow diagram form the operation of the present dynamic test unit. At step 201, the operator connects a voice terminal 110, such as the 8434DX voice terminal to the test facility common test port 130. The dynamic test unit 102 at step 202 performs the voice terminal detection function described above using the automated voice terminal protocol identification system 101, and optionally barcode reader 108, and identifies the type of voice terminal (8434DX) that is connected to the common test port 130. The controller 109 at step 203 uses the terminal identification data to access database 104 in memory 106 and retrieve the one of the plurality of virtual terminal images that are stored therein that corresponds to the identified voice terminal. The controller 109 at step 204 activates renderer 105 to present the virtual terminal image to the operator on the monitor 103 with the present state of the voice terminal 110 being visually displayed to the operator. In FIG. 3, the voice terminal is shown as being on hook and no Light Emitting Diodes or buttons are active.

Once the virtual terminal image is displayed to the operator, and the correspondence between the virtual terminal image and the actual voice terminal under test 110 at step 205, the test facility at step 206 multiplexes the proper hardware connection (ATL/ETR; Digital Communication Protocol (DCP)—2 wire and 4 wire; and ISDN/NT2–4 wire) to the voice terminal under test 110 and establishes a communication linkwith the voice terminal undertest 110 at step 207. At step 208, the operator activates a series of test procedures to test the operation of the voice terminal under test 110. For example, at step 209 the operator operates button 1 on the voice terminal under test 110 and the voice terminal under test 110 transmits a button 1 state change message to the test facility 100 via common test port 130 at step 210. The test sequencer 107 of the test facility 100 receives the button operation message and transmits a terminal state update message to controller 109 which responds at step 211 by displaying the button 1 as being operated on the virtual display to the controller 109. The test sequencer circuitry 107 also transmits an Alert update message at step 212 to the voice terminal under test 110 to light the appropriate LED and cause the voice terminal under test 110 to produce an audible signal (beep) as is its normal operation and an LED update message to the controller 109 to thereby update the virtual terminal image to correspond the voice terminal under test at step 213. Thus, the operator can visually compare the expected state of the voice terminal under test 110 as presented in the virtual terminal image on monitor 103 with the actual state of the voice terminal under test 110. This simplifies the determination of a failure in the operation of the voice terminal under test 110.

Another test that can be implemented in the test facility 100 is the audio transmission test, wherein the handset from the voice terminal under test 110 is placed in a fixture that is equipped with audio detect and audio output elements that are positioned to be juxtaposed to the handset earpiece and mouthpiece, respectively. The test sequencer circuitry 107 transmits tones to the voice terminal under test 110 and activates controller 109 to display a waveform indicative of the transmitted audio signal on the monitor 103. The test facility 100 also receives the output from the audio detect element and controller 109 displays a waveform of this audio output from the handset of the voice terminal under test 110 so the operator can visually compare the applied and received signals. The test facility 100 can also include circuitry to automatically compare the two waveforms to identify any anomalies in the received audio output from the voice terminal under test 110. In particular, the amplitude and frequency components of the return signal are compared with those of the transmitted signal.

SUMMARY

Thus, the dynamic test unit presents the operator with a dynamically changing visual representation of the voice terminal under test and its present state. This visual representation provides the operator with an enhanced visual comparison of voice terminal under test with the virtual representation to verify both the type of voice terminal under test and its present state.

What is claimed:

1. A system, operational in a test facility, for dynamically representing a visual image of a voice terminal that is connected to a test port, having a plurality of terminals, of said test facility, comprising:
means for determining an identity of said voice terminal that is connected to said test port, comprising
means for applying a single set of low potential signals to at least two of said plurality of terminals of said test port,
means for monitoring at least one of said plurality of terminals of said test port to measure signals appearing thereon in response to application of said single set of low potential signals, means for determining, in response to said single set of low potential signals and said measured signals, an identity of one of a plurality of voice terminal types that is connected to said test port;

means for generating on a monitor device an image that represents said voice terminal; and means, responsive to signals received from said voice terminal, for displaying on said image a present state of said voice terminal as defined by said signals.

2. The system for dynamically representing a visual image of a voice terminal of claim 1 wherein said means for generating comprises:

means for storing in a memory a plurality of predetermined images of various voice terminal types;

means, responsive to said means for determining confirming an identity of said voice terminal, for retrieving a one of said plurality of predetermined voice terminal images from said memory corresponding to said identified voice terminal; and means for rendering said retrieved predetermined voice terminal image in visual form on said monitor device.

3. The system for dynamically representing a visual image of a voice terminal of claim 2 wherein said means for displaying comprises:

means, responsive to operation of a button on said voice terminal by an operator, as communicated in signals received from said voice terminal, for displaying on said predetermined voice terminal image a present operational state of said operated button on said predetermined voice terminal image as defined by said signals.

4. The system for dynamically representing a visual image of a voice terminal of claim 3 wherein said means for displaying further comprises:

means, responsive to operation of a button on said voice terminal by an operator, as communicated in signals received from said voice terminal, for displaying on said predetermined voice terminal image a present operational state of a visual indicator associated with said operated button as defined by said signals.

5. The system for dynamically representing a visual image of a voice terminal of claim 3 wherein said means for displaying comprises:

means, responsive to application of a predetermined signal waveform to said voice terminal, for displaying on said monitor device a waveform representation of said signal waveform.

6. The system for dynamically representing a visual image of a voice terminal of claim 5 wherein said means for displaying further comprises:

means, responsive to receipt of a signal waveform from said voice terminal, for displaying on said monitor device a waveform representation of said received signal waveform.

7. A method of operating a system, operational in a test facility, for dynamically representing a visual image of a voice terminal that is connected to a test port, having a plurality of terminals, of said test facility, comprising the steps of:

determining an identity of said voice terminal that is connected to said test port, comprising:

applying a single set of low potential signals to at least two of said plurality of terminals of said test port, monitoring at least one of said plurality of terminals of said test port to measure signals appearing thereon in response to application of said single set of low potential signals.

determining, in response to said single set of low potential signals and said measured signals, an identity of one of a plurality of voice terminal types that is connected to said test port;

generating on a monitor device an image that represents said voice terminal; and displaying, in response to signals received from said voice terminal, on said image a present state of said voice terminal as defined by said signals.

8. The method of operating a system for dynamically representing a visual image of a voice terminal of claim 7 wherein said step of generating comprises:

storing in a memory a plurlaity of predetermined images of various voice terminal types;

retrieving, in response to said means for determining confirming an identity of said voice terminal, a one of said plurality of predetermined voice terminal images from said memory corresponding to said identified voice terminal; and rendering said retrieved predetermined voice terminal image in visual form on said monitor device.

9. The method of operating a system for dynamically representing a visual image of a voice terminal of claim 8 wherein said step of displaying comprises:

displaying, in response to operation of a button on said voice terminal by an operator, as communicated in signals received from said voice terminal, on said predetermined voice terminal image a present operational state of said operated button on said predetermined voice terminal image as defined by said signals.

10. The method of operating a system for dynamically representing a visual image of a voice terminal of claim 9 wherein said step of displaying further comprises:

displaying, in response to operation of a button on said voice terminal by an operator, as communicated in signals received from said voice terminal, on said predetermined voice terminal image a present operational state of a visual indicator associated with said operated button as defined by said signals.

11. The method of operating a system for dynamically representing a visual image of a voice terminal of claim 8 wherein said step of displaying comprises:

displaying, in response to application of a predetermined signal waveform to said voice terminal, on said monitor device a waveform representation of said signal waveform.

12. The method of operating a system for dynamically representing a visual image of a voice terminal of claim 11 wherein said step of displaying further comprises:

displaying, in response to receipt of a signal waveform from said voice terminal, on said monitor device a waveform representation of said received signal waveform.

* * * * *